B. F. PAXTON.
STUMP BURNER.
APPLICATION FILED JULY 12, 1917.
1,347,054.
Patented July 20, 1920.
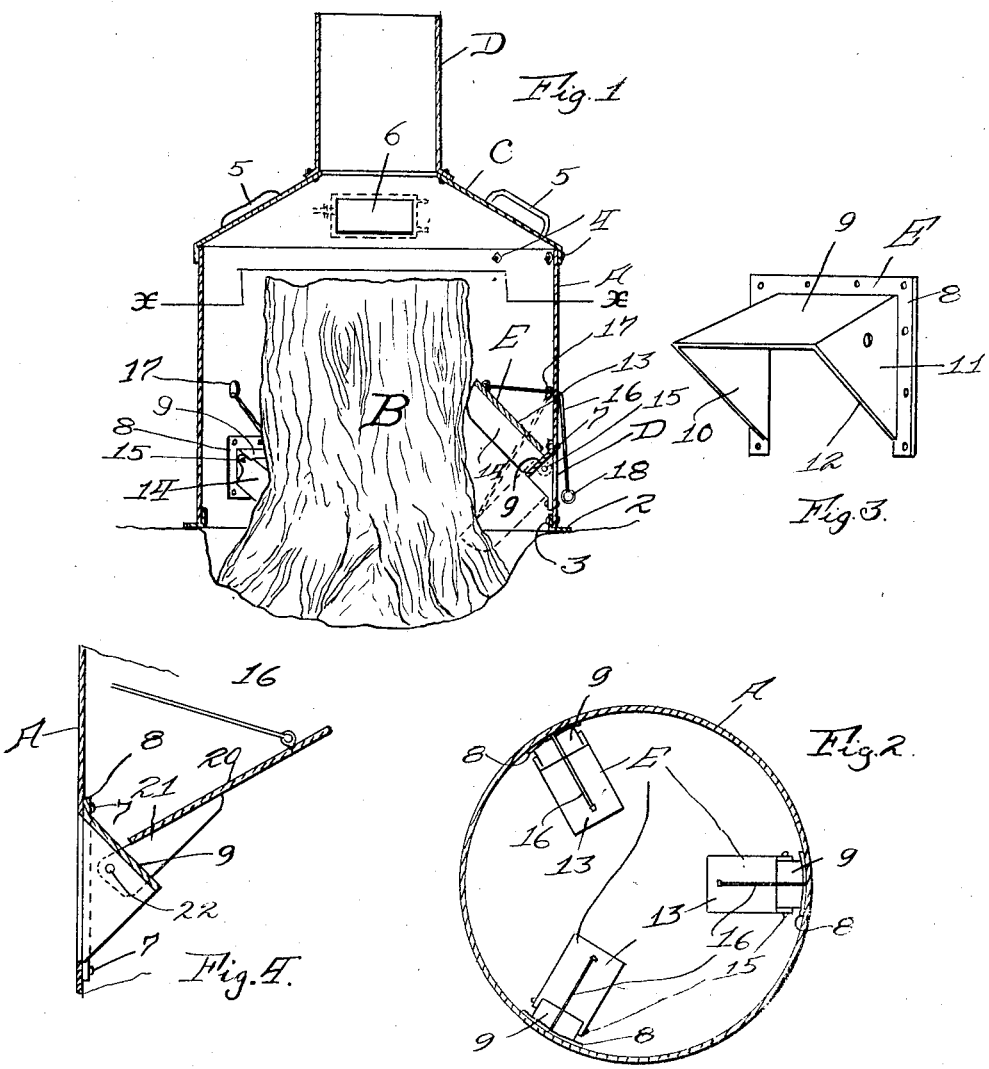
Inventor:
Benjamin F. Paxton.
by: S. Bradbury
Attorney.

UNITED STATES PATENT OFFICE.

BENJAMIN F. PAXTON, OF ST. PAUL, MINNESOTA.

STUMP-BURNER.

1,347,054.

Specification of Letters Patent.

Patented July 20, 1920.

Application filed July 12, 1917. Serial No. 180,218.

*To all whom it may concern:*

Be it known that I, BENJAMIN F. PAXTON, a citizen of the United States, residing at St. Paul, in the county of Ramsey and State of Minnesota, have invented a new and useful Improvement in Stump-Burners, of which the following is a specification.

This invention relates to improvements in stump burners, and more particularly is an improvement upon the construction disclosed in my companion application for patent Serial Number 703,680, filed on the 14th day of June, 1912. The particular improvements involved in my present invention relate to the means employed for directing the draft upon the stump being burned in a downward and lateral direction, so as to most effectively consume the roots and body of the stump.

Among further objects of my invention are simplicity of construction and greater effectiveness in use.

To these ends my invention comprises the features of construction and combination of parts hereinafter described and claimed.

In the accompanying drawing forming part of this specification, Figure 1 is a vertical central section of my invention showing the same applied to a stump as when in use; Fig. 2 is a section taken on the line X—X of Fig. 1; Fig. 3 is a perspective of part of the draft deflecting element, and Fig. 4 is a section of a detail of an alternative construction.

In the drawing, let A indicate a suitable furnace housing, the body of which is a vertical cylindrical shell reinforced around its lower edge by the angle member 2, which is secured thereto by rivets or other suitable means. This housing is adapted to be placed over a stump to be consumed, such as B, after a portion of the roots have been uncovered, so as to expose them most effectively for burning. C indicates a conical top or cap, which is detachably placed upon the upper end of the housing, and provided with a smoke pipe or chimney D of suitable size and length to most effectively assist in producing draft and conducting smoke and gases from the burning stump to the outer atmosphere. If desired, the top or cap may be secured upon the body of the housing by bolts 4 and handles 5 may be attached to the top or cap for convenience in moving the device from place to place and adjusting it in position over stumps to be burned. A suitable door 6 hinged upon the cap may also be employed for convenience in inspecting the stump in the burner or for placing refuse or material around the stump to kindle a fire and ignite the stump.

Arranged near the lower end of the cylindrical body are a plurality of evenly distributed draft openings D, it being contemplated that one or any number may be employed within the spirit of my invention. Secured around the edge of each of these openings by rivets 7 or other suitable means is a frame 8 of an inwardly projecting down draft director and spreader E, which is in the form of an inwardly and downwardly slanting plate 9 having two oppositely disposed sides 10 and 11, the inner edges 12 of which slant from the innermost extremity of the plate 9 to the lower extremities of the sides of the frame 8. This draft deflector and spreader described is adapted to deflect and spread the draft which enters through the corresponding opening D downwardly against the lower portion of the stump in the burner, it being stationary, rigid and never changed. There is one of these draft deflectors and spreaders arranged around each of the draft openings, so as to supply and distribute draft entirely around the stump most effectively. When desired, each of the stationary down draft deflectors and spreaders may be provided with a movable down draft deflector and spreader E, which is arranged to change in position and gradually deflect draft from an upward course into a downward course as the stump is consumed, so that when the stump is nearly consumed, the entire draft entering through the opening D is directed downwardly and inwardly to the central portion of the roots of the stump, thereby most effectively completing the burning process. This movable draft deflector and spreader is in the form of a flat plate 13 having two longitudinal downturned sides 14, which complete the formation of an inverted shallow trough through which a current of air is supplied to the stump. The outer ends of the sides 14 overlap the sides 10 and 11 of the stationary draft deflector and spreader and are pivoted thereto by rivets 15 or other suitable means. It will be understood that one of these movable draft elements may be provided on each of the stationary draft elements, and that when the burning of the stump is started, the stump burner is in a position over the stump with the movable draft elements inclining upwardly and resting with their inner ends against the stump and gradually lower automatically as the stump is consumed. To assist in lifting the inner ends of the movable draft elements and adjusting them against the stump, a chain 16 or other means is secured to the inner end of each movable draft element and moved outwardly through a small opening 17 in the side of the body of the housing, a ring 18 being secured to the outermost end of the chain to prevent the chain from moving out of operative position.

When desired, the movable draft element may be in the form of a plate 20 as illustrated in Fig. 4, said plate being hinged to the stationary draft element by small flanges or ears 21 and rivets or other suitable means pivotally secured through said ears and the sides of the stationary draft element.

With the invention above described, the draft is effectively deflected from a horizontal into an upward and downward direction and is sufficiently spread so as to supply and distribute the draft over a wider range than by the use of a blast tube, such as is described in my companion application for patent above referred to. The construction also is simpler and more durable and less expensive.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:—

1. A stump burner, comprising, a casing adapted to inclose a stump, having a draft inlet, a movably adjusted draft director cooperating with a stationary draft director secured to the casing over said inlet, said movable director comprising a laterally and inwardly extending blade, whereby draft is changed in a further downward direction and spread on the stump, and means for raising and securing said movable director in elevated position.

2. A stump burner, comprising, a furnace housing adapted to inclose a stump, said housing having a draft opening in its side, and a stationary draft deflector comprising a support secured to said housing adjacent said opening, formed with an overhanging downwardly and inwardly inclined deflector plate adapted to change a horizontal draft to a down draft and sides extending between the side edges of said plate and said housing.

3. A stump burner, comprising, a furnace housing open at the bottom and adapted to inclose a stump, said housing having a draft opening in its side and an inwardly and downwardly inclined deflector and spreader fixed to the side of said housing above said opening to produce a down draft and an auxiliary draft deflector and spreader movably disposed at one end of said fixed deflector and spreader within said housing whereby the free end of said movable deflector and spreader may change its position automatically to direct a draft downwardly against the stump being consumed during the lower portion of its descent.

4. A stump burner, comprising, a casing adapted to inclose a stump and having a draft opening in its side, a stationary deflector secured to said housing above said opening and extending inwardly and downwardly to produce a down draft and a movable deflector having a spreader, said spreader being adapted to rest upon the stump and to descend as the stump burns away and change the direction of the draft farther downward during the lower portion of its descent.

5. A stump burner, comprising, a casing adapted to inclose a stump and having a draft opening in its side, a stationary deflector secured to said housing above said opening and extending inwardly and downwardly to produce a down draft, a movable deflector blade having a spreading surface secured to said fixed deflector and adapted to rest upon the stump and to descend as the stump burns away and change the direction of and spread the draft during the lower portion of its descent, and means for raising said blade.

In testimony whereof, I have signed my name to this specification.

BENJAMIN F. PAXTON.